United States Patent
Fan et al.

(10) Patent No.: US 7,702,474 B2
(45) Date of Patent: Apr. 20, 2010

(54) APPARATUS AND METHOD FOR TESTING DATA TRANSFER RATE

(75) Inventors: Chiou-Lin Fan, Taipei Hsien (TW); Pao-Feng Huang, Taipei Hsien (TW); Chin-Feng Chen, Taipei Hsien (TW); Yuan-Hung Chien, Taipei Hsien (TW)

(73) Assignee: Hon Hai Precision Industry Co., Ltd., Tu-Cheng, Taipei Hsien (TW)

(*) Notice: Subject to any disclaimer, the term of this patent is extended or adjusted under 35 U.S.C. 154(b) by 252 days.

(21) Appl. No.: 11/782,650

(22) Filed: Jul. 25, 2007

(65) Prior Publication Data

US 2008/0120067 A1 May 22, 2008

(30) Foreign Application Priority Data

Nov. 17, 2006 (CN) ................. 2006 1 0156908

(51) Int. Cl.
*G01R 29/02* (2006.01)

(52) U.S. Cl. .................. 702/79; 375/225; 375/226

(58) Field of Classification Search ............ 702/79, 702/89, 117, 122, 125, 126, 176–178, 186; 375/225, 226, 228; 713/500, 502, 503
See application file for complete search history.

(56) References Cited

U.S. PATENT DOCUMENTS

| 6,671,814 | B1 | 12/2003 | Kubo et al. | |
|---|---|---|---|---|
| 6,959,355 | B2 | 10/2005 | Szabelski | |
| 7,047,347 | B2 | 5/2006 | Feng | |
| 2003/0033417 | A1* | 2/2003 | Zou et al. | 709/230 |
| 2003/0131267 | A1* | 7/2003 | Berthoud | 713/300 |

* cited by examiner

*Primary Examiner*—Manuel L Barbee
(74) *Attorney, Agent, or Firm*—Frank R. Niranjan

(57) ABSTRACT

A method for testing a data transfer rate of an electronic device includes: receiving data transmitted from the electronic device and converting the data into test data; analyzing the test data; encoding the analyzed data to generate output data; and displaying a state of the data transfer rate based on the output data.

15 Claims, 4 Drawing Sheets

APPARATUS AND METHOD FOR TESTING DATA TRANSFER RATE

BACKGROUND OF THE INVENTION

1. Field of the Invention

This invention generally relates to data transfer rates, and particularly to an apparatus and method for testing a data transfer rate.

2. Description of Related Art

Nowadays, electronic devices, such as personal computers, digital cameras, and portable audio/video players, are widely used for a variety of applications. An electronic device usually includes a data transfer interface for transmitting data, such as a Universal Serial Bus (USB) interface or an IEEE 1394 interface etc. For example, an MP3 player downloads songs from a personal computer via the USB interface.

Most people are concerned about data transfer rates between the electronic devices. For example, when someone is going to download a plurality of MP3 files to the MP3 player, a shortest time for downloading the MP3 files is desired. Although a maximum data transfer rate of one specific interface is a constant value, for example, the maximum data transfer rate of USB 2.0 is 480 Mbps. An actual data transfer rate of the specific interface is variable according to different application environments. The actual data transfer rate is affected by many factors, such as an interface controller, data transfer circuit layout, and electromagnetic environment. That is, the actual data transfer rates of different electronic devices are different even when using the same interface standard. Some electronic devices are screened out during data transfer rates testing. If the data transfer rates of the electronic devices are too low, the devices are ineligible to be labeled with the particular data transfer rates rating.

In order to screen out ineligible electronic devices, standardized tests are performed. Traditionally, a storage device is employed in the tests. The storage device is connected to the electronic device for receiving a predetermined file transmitted from the electronic device. If a transmission time of the predetermined file is no more than a predetermined time, the electronic device is eligible. However, if a transmission time of the predetermined file is more than the predetermined time, the electronic device is ineligible.

Reliability is also a factor in the testing of data transfer rates. If the data transfer rate of the electronic device is not reliable, while the predetermined file in the electronic device is copied to the storage device in the predetermined time. The electronic device will be recognized as an eligible electronic device according to the traditional testing method. That is, the traditional testing method is not able to test a stability of the data transfer rate. The electronic device is considered to be eligible even if the data transfer rate of the electronic device is not reliable.

Therefore, an improved method and apparatus for testing the data transfer rate are desired.

SUMMARY OF THE INVENTION

A apparatus for testing stability of a data transfer rate of an electronic device includes a test interface for connecting the apparatus to the electronic device; a data collector for receiving data transmitted from the electronic device via the test interface and converting the data into test data compatible with the apparatus; an analysis module coupled to the data collector for analyzing the test data; an encoder constructed and arranged for receiving the analyzed data and encoding the analyzed data to generate output data; a display module; and a display controller couple to the encoder and the display module for controlling the display module to display a state of the data transfer rate based on the output data.

A method for testing a data transfer rate of an electronic device includes: receiving data transmitted from the electronic device and converting the data into test data; analyzing the test data; encoding the analyzed data to generate output data; and displaying a state of the data transfer rate based on the output data.

Other advantages and novel features will become more apparent from the following detailed description of preferred embodiments when taken in conjunction with the accompanying drawings, in which:

BRIEF DESCRIPTION OF THE DRAWINGS

Many aspects of the apparatus and method can be better understood with reference to the following drawings. The components in the drawings are not necessarily to scale, the emphasis instead being placed upon clearly illustrating the principles of the present apparatus and method. Moreover, in the drawings, like reference numerals designate corresponding parts throughout the several views.

DETAILED DESCRIPTION OF THE INVENTION

Reference will now be made to the drawings to describe a preferred embodiment of a present test apparatus and a method for testing a data transfer rate, in detail.

Figure 1:
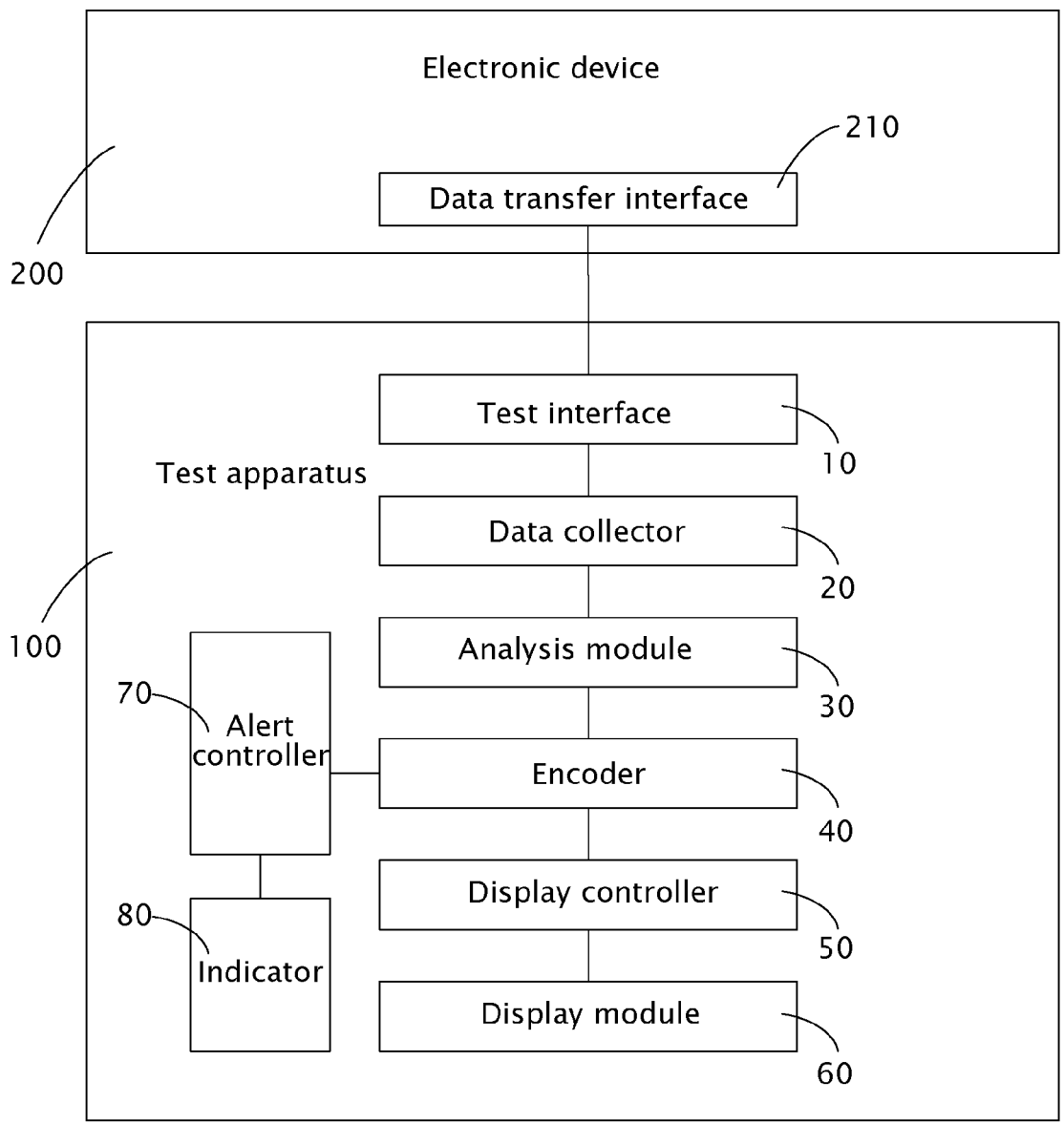
FIG. 1 is a block diagram of an electronic device and a test apparatus in accordance with an exemplary embodiment.

Referring to FIG. 1, a test apparatus 100 is coupled to an electronic device 200 for testing a data transfer rate of the electronic device 200. The electronic device 200 includes a data transfer interface 210 for transmitting and/or receiving data. The data transfer interface 210 can be, for example, but not limited to, a USB interface or an IEEE1394 interface.

The test apparatus 100 includes a test interface 10, a data collector 20, an analysis module 30, an encoder 40, a display controller 50, a display module 60, an alert controller 70, and an indicator 80.

The test interface 10 is used for connecting to the data transfer interface 210, thus the electronic device 200 and the test apparatus 100 can communicate with each other. The test interface 10 and the data transfer interface 210 employ the same kind of interface. For example, if the data transfer interface 210 is a USB receptacle, the test interface 10 is a USB plug.

The data collector 20 is constructed and arranged for receiving the data transmitted from the electronic device 200 and converting the data into test data compatible with the test apparatus 100. For example, if the test interface 10 is the USB interface, the data collector 30 captures data signals and clock signals from differential signals of the USB specification and converts the received data into test data compatible with the test apparatus 100.

The analysis module 30 is coupled to the data collector 20 for analyzing the test data. The analysis module 30 handles USB packets and recognizes endpoints to generate analyzed data that is suitable for the encoder 40 to process.

The encoder 40 is used for receiving the analyzed data and encoding the analyzed data to generate output data. Exemplarily, the output data can be 8 bits of binary data, thus the data transfer rate can be divided to 8 levels. If the data transfer rate pertains to one level, one bit of the output data corresponding to the level is set to "1", other bits of the output data are set to "0". For example, when the data transfer rate pertains to the highest level, the output data are set to 1000 0000; similarly, when the data transfer rate pertains to the lowest level, the output data are set to 0000 0001.

The display controller 50 is constructed and arranged for controlling the display module 60 to display a state of the data transfer rate based on the output data. The display controller 50 is able to control display modules selected from a group consisting of light emitting diodes, LED-based 7-segment display devices, and liquid crystal displays.

The alert controller 70 is coupled to the encoder 40 for signaling the indicator 80. If the data transfer rate indicated by the output data is lower than a predetermined value, the alert controller 70 signals the indicator 80 to send an alert. For example, when "1" has been set to one of the lower 4 bits of the output data, the alert controller 70 signals the indicator 80 to send the alert. The indicator 80 can be, for example, but not limited to, an LED or a speaker.

Figure 2:
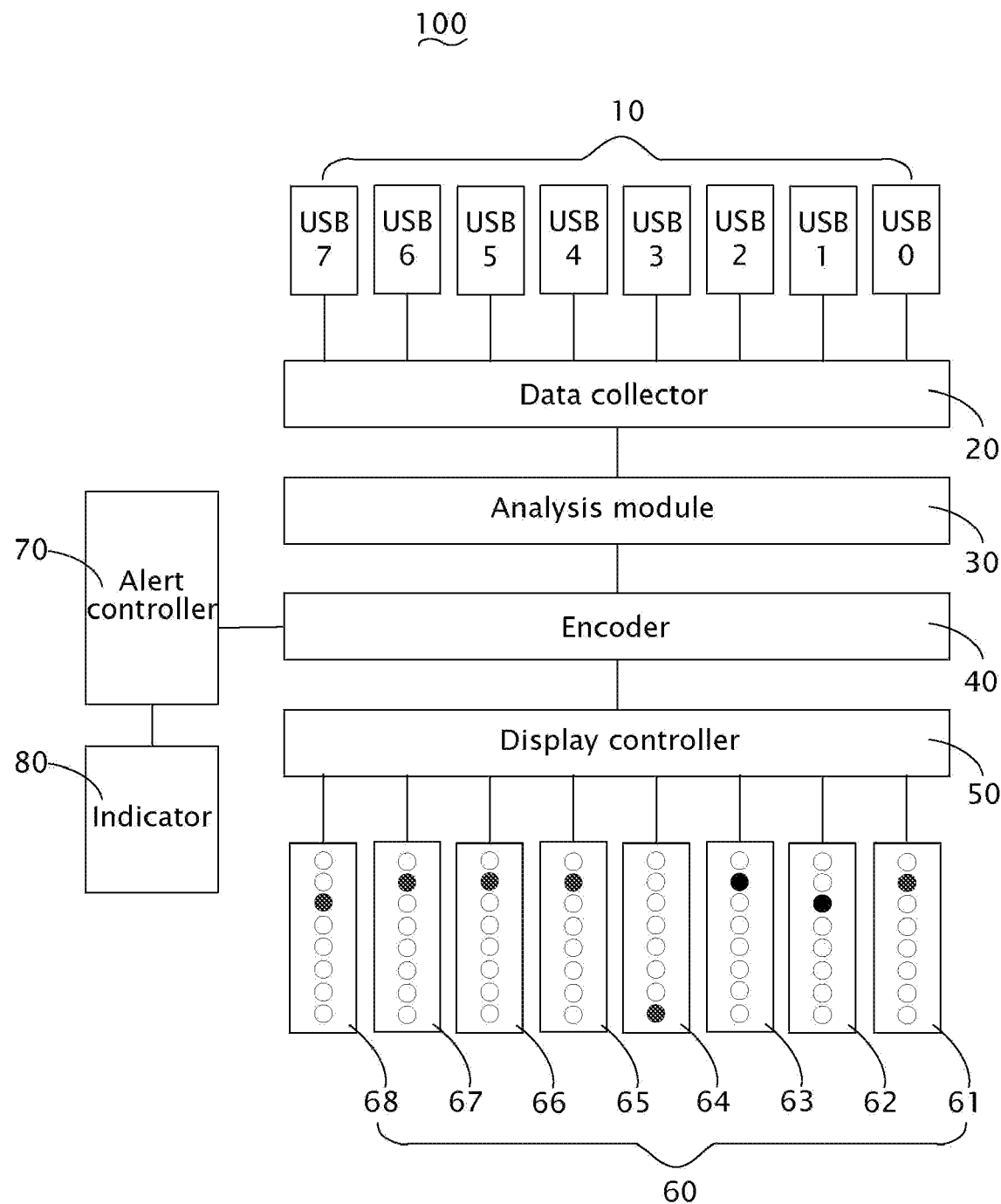
FIG. 2 is a block diagram of the test apparatus of FIG. 1 in accordance with an exemplary embodiment.

Referring to FIG. 2, an embodiment of the test interface 10 includes 8 USB interfaces labeled from USB0 to USB7. The display module 60 includes 8 display units 61~68 corresponding to the 8 USB interfaces. Each display unit 61~68 includes 8 LEDs, and the LEDs are defined to emit light based on different data transfer rate levels. For example, if the data transfer rate of the USB0 is in a second high level, that is, the output data are 0100 0000, only a second LED in the display unit 61 emits light. If the data transfer rate of the USB3 is in a lowest level, that is, the output data are 0000 0001, only an eighth LED in the display unit 64 emits light. Therefore, if the data transfer rate of any of the USB interfaces is not reliable, that is, the data transfer rate varies between the levels, and the corresponding display unit will flash among the 8 LEDs thereof.

Figure 3:
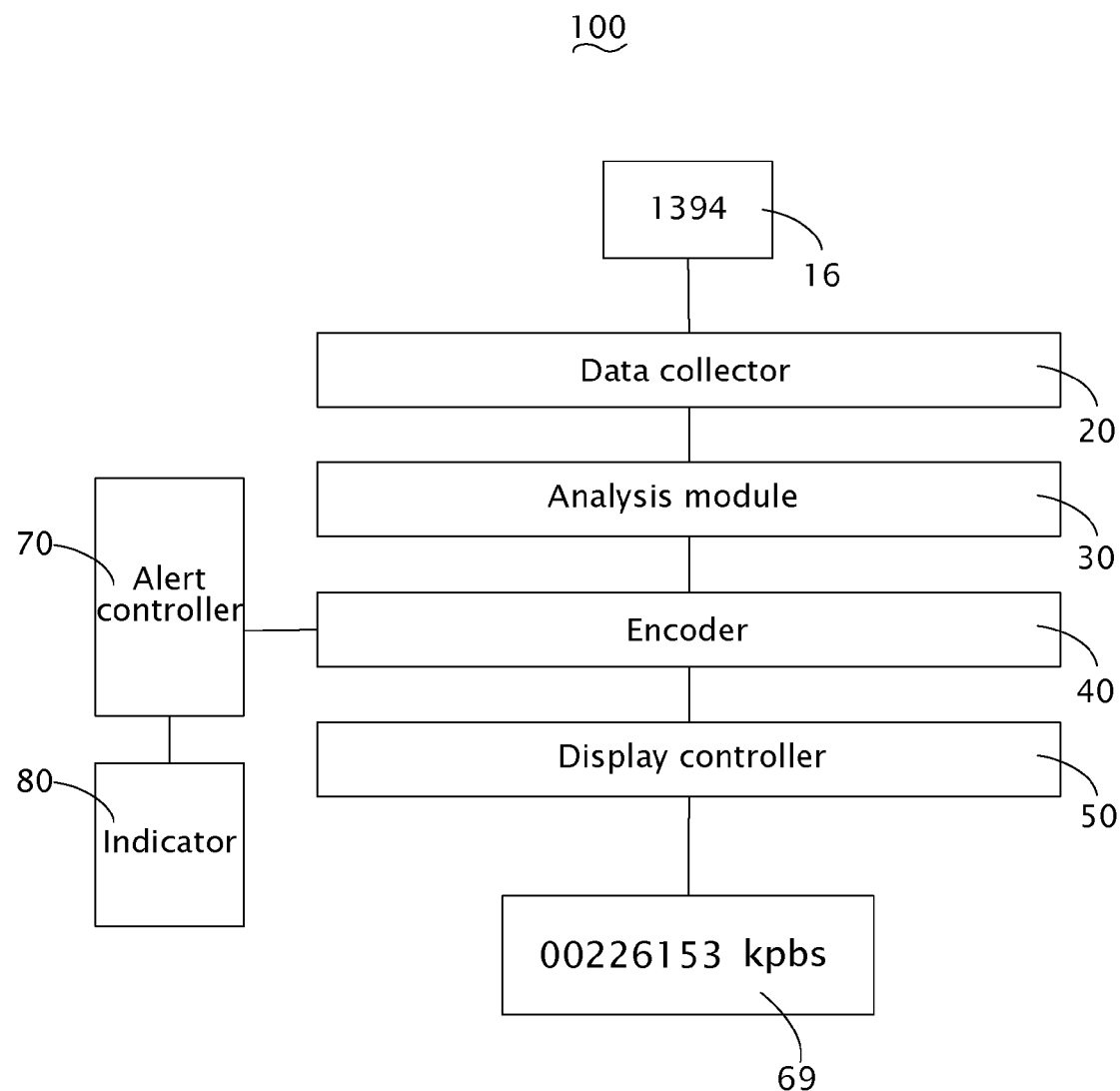
FIG. 3 is a block diagram of the test apparatus of FIG. 1 in accordance with an another exemplary embodiment.

Referring to FIG. 3, another embodiment of the test interface 10 includes an IEEE 1394 interface. The display module 60 (shown in FIG. 2) includes a numeric display device 69 to indicate the data transfer rate of the IEEE 1394 interface. The numeric display device 69 can be an LED-based 7-segment display device or a Liquid Crystal Display (LCD) device. The data transfer rate can be displayed on the numeric display device 69 in real-time.

The test apparatus 100 tests the data transfer rate of the electronic device 200 by displaying the data transfer rate on the display module 60, thus the stability of the data transfer rates can be monitored.

Figure 4:
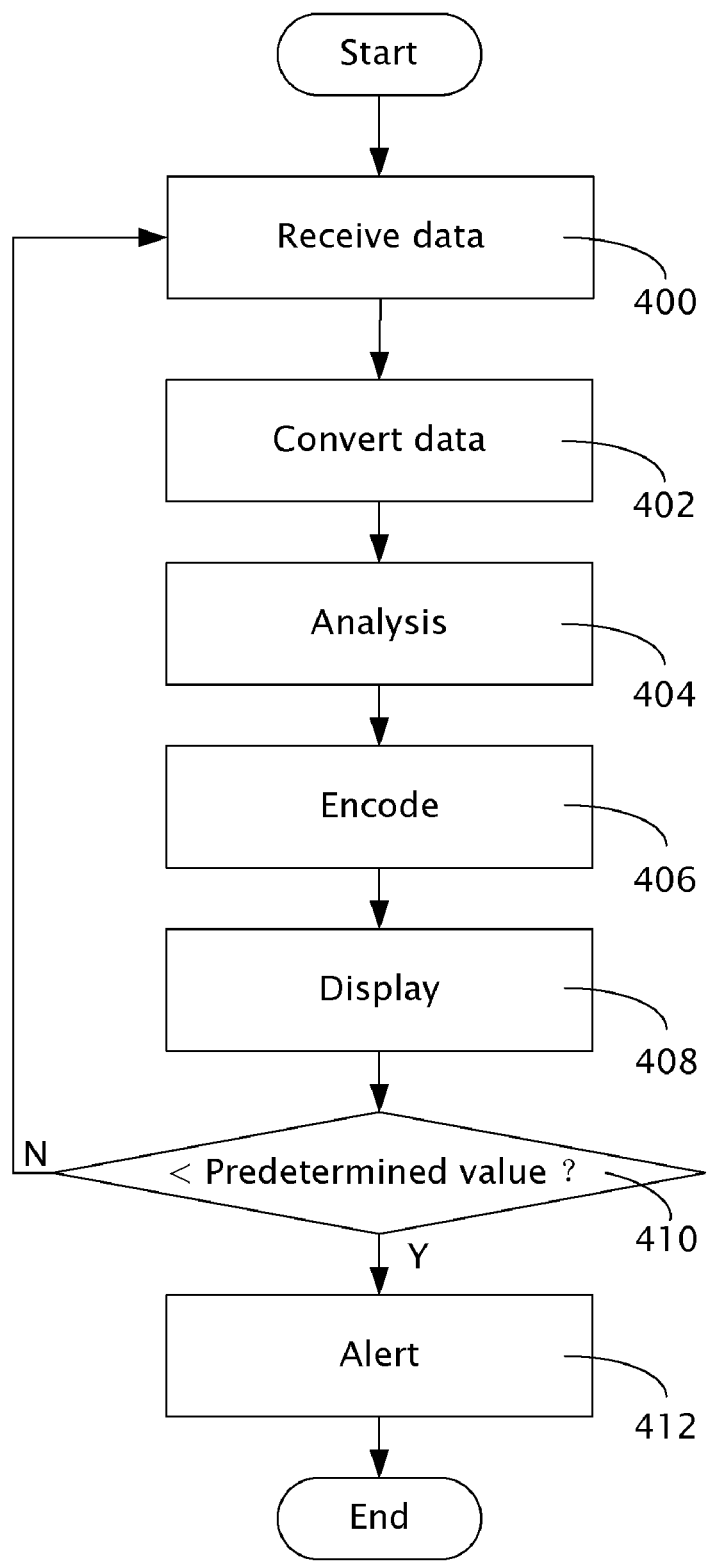
FIG. 4 is a procedure of a method for testing a data transfer rate.

Referring to FIG. 4, a procedure of a method for testing stability of the data transfer rate of the electronic device 200 is illustrated.

First, in step 400, communicate with the electronic device 200 via the test interface 10 for receiving data from the electronic device 200.

In step 402, convert the data into test data compatible with the test apparatus 100. For example, if the test interface 10 is the USB interface, the data collector 30 captures data signals and clock signals from differential signals of the USB specification and converts the received data into test data compatible with the test apparatus 100.

In step 404, analyze the test data to generate the analyzed data that is suitable for the encoder 40 to process. In the situation of the USB interface, the analysis module 30 handles USB packets and recognizes endpoints to generate the analyzed data that is suitable for the encoder to process.

In step 406, encode the analyzed data to generate output data. The output data can be 8 bits of binary data, thus the data transfer rate can be divided to 8 levels. If the data transfer rate pertains to one level, one bit of the output data corresponding to the level is set to "1", other bits of the output data are set to "0". For example, when the data transfer rate pertains to the highest level, the output data are set to 1000 0000; contrarily, when the data transfer rate pertains to the lowest level, the output data are set to 0000 0001.

In step 408, display state of the data transfer rate. For example, when one bit of the output data is set to "1", control one LED corresponding to the bit that is set to "1" to emit light.

In step 410, determine whether the data transfer rate is lower than a predetermined value. If the data transfer rate is lower than the predetermined value, enable the indicator 80 to send an alert (step 412). For example, when the bit that is set to "1" locates at one of the lower 4 bits of the output data, enable the indicator to send the alert. The indicator 80 can be, for example, but not limited to, an LED or a speaker. If the data transfer rate is not lower than the predetermined value, the procedure goes back to step 400.

The method for testing the stability of the data transfer rate is able to display the data transfer rate, thus the stability of the data transfer rates can be monitored. Therefore, the electronic device having an unreliable data transfer rate can be screened out.

The embodiments described herein are merely illustrative of the principles of the present invention. Other arrangements and advantages may be devised by those skilled in the art without departing from the spirit and scope of the present invention. Accordingly, the present invention should be deemed not to be limited to the above detailed description, but rather by the spirit and scope of the claims that follow, and their equivalents.

What is claimed is:

1. An apparatus for testing stability of a data transfer rate of an electronic device, the apparatus comprising:
   a test interface for connecting the apparatus to the electronic device, the test interface being a USB interface;
   a data collector for receiving data represented by differential signals comprising data signals and clock signals transmitted from the electronic device via the test interface and capturing the data signals and the clock signals to generate test data compatible with the apparatus, the test data comprising USB packets;
   an analysis module coupled to the data collector for handling the USB packets of the test data and recognizing endpoints of the USB packets to generate analyzed data;
   an encoder constructed and arranged for receiving the analyzed data and encoding the analyzed data to generate output data;
   a display module; and
   a display controller couple to the encoder and the display module for controlling the display module to display a state of the data transfer rate based on the output data.

2. The apparatus as claimed in claim 1, wherein the output data are 8 bits of binary data.

3. The apparatus as claimed in claim 2, wherein each bit of the output data represents a level of the data transfer rate, when the data transfer rate pertains to one level, one bit of the output data corresponding to the level is set to "1", other bits of the output data are set to "0".

4. The apparatus as claimed in claim 1, wherein the display module comprises a plurality of light emitting diodes, each light emitting diode is configured for emitting light to indicating a respective level of the data transfer rate.

5. The apparatus as claimed in claim 4, wherein the display controller controls one of the light emitting diodes to emit light representing a corresponding level of the data transfer rate based on the output data.

6. The apparatus as claimed in claim 5, wherein it is determined that the data transfer rate is not reliable when the plurality of light emitting diodes flash.

7. The apparatus as claimed in claim 1, wherein the display module comprises a numeric display device for displaying a numeric data transfer rate.

8. The apparatus as claimed in claim 1, farther comprising an alert controller for determining whether the data transfer rate is lower than a predetermined value.

9. The apparatus as claimed in claim 8, further comprising an indicator coupled to the alert controller for outputting an alert when the alert controller determines that the data transfer rate is lower than the predetermined value.

10. A method for testing a data transfer rate of an electronic device, the method comprising:
receiving data represented by differential signals comprising data signals and clock signals transmitted from the electronic device via a USB interface, and capturing the data signals and the clock signals to generate test data comprising USB packets;
analyzing the test data by handling the USB packets and recognizing endpoints of the USB packets to generate analyzed data;
encoding the analyzed data to generate output data; and
displaying a state of the data transfer rate based on the output data.

11. The method as claimed in claim 10, further comprising: sending an alert when the data transfer rate is lower than a predetermined value.

12. The method as claimed in claim 10, wherein the step of encoding the analyzed data comprises: encoding the analyzed data into 8 bits of binary data to generate the output data, each bit of the output data represents a level of the data transfer rate; when the data transfer rate pertains to one level, one bit of the output data corresponding to the level is set to "1", other bits of the output data are set to "0".

13. The method as claimed in claim 10, wherein when the data transfer rate is not reliable, a plurality of light emitting diodes emit lights from one to another.

14. The method as claimed in claim 10, wherein the step of displaying a state of the data transfer rate comprises controlling a light emitting diode to emit light.

15. The method as claimed in claim 10, wherein the step of displaying a state of the data transfer rate comprises displaying a numeric data transfer rate.

* * * * *